United States Patent
Coronado et al.

(10) Patent No.: US 10,649,673 B2
(45) Date of Patent: *May 12, 2020

(54) QUEUING READ REQUESTS BASED ON WRITE REQUESTS

(71) Applicant: International Business Machines Corporation, Armonk, NY (US)

(72) Inventors: Juan A. Coronado, Tucson, AZ (US); Lisa R. Martinez, Escondido, CA (US); Beth A. Peterson, Tucson, AZ (US); Clint A. Hardy, Tucson, AZ (US); Jennifer S. Shioya, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/383,776

(22) Filed: Apr. 15, 2019

(65) Prior Publication Data

US 2019/0243564 A1 Aug. 8, 2019

Related U.S. Application Data

(63) Continuation of application No. 15/260,557, filed on Sep. 9, 2016, now Pat. No. 10,346,061, which is a
(Continued)

(51) Int. Cl.
G06F 3/06 (2006.01)
G06F 16/2455 (2019.01)
(Continued)

(52) U.S. Cl.
CPC ............ *G06F 3/0619* (2013.01); *G06F 3/065* (2013.01); *G06F 3/067* (2013.01); *G06F 3/0665* (2013.01);
(Continued)

(58) Field of Classification Search
CPC ...... G06F 3/0619; G06F 3/065; G06F 3/0665; G06F 3/067; G06F 11/1446;
(Continued)

(56) References Cited

U.S. PATENT DOCUMENTS 5,742,792 A 4/1998 Yanai et al.
5,924,121 A 7/1999 Arimilli et al.
(Continued)

OTHER PUBLICATIONS

Anonymous, "Apparatus and Device for Host Read all the time", ip.com Prior Art Database Technical Disclosure, ip.com No. IPCOM000232353D, Nov. 3, 2013, 4 pages. http://ip.com/ipcom/000232353.
(Continued)

*Primary Examiner* — Christopher D Birkhimer
(74) *Attorney, Agent, or Firm* — Grant M. McNeilly

(57) ABSTRACT

Embodiments of the present disclosure may relate to methods and a computer program product for allowing writes based on a granularity level. The method for a storage server may include receiving a received granularity level for a particular volume of a storage device of a client computer including an effective duration for the received granularity level. The method may include receiving an anticipated write to the particular volume at an anticipated write granularity level. The method may include verifying whether the anticipated write granularity level substantially matches the received granularity level at the effective duration. The method may also include writing, in response to the anticipated write granularity level substantially matching the received granularity level at the effective duration, the anticipated write to the particular volume for the received granularity level.

17 Claims, 7 Drawing Sheets

Related U.S. Application Data continuation of application No. 14/186,773, filed on Feb. 21, 2014, now Pat. No. 9,535,856.

(51) Int. Cl.
| | | |
|---|---|---|
| *G06F 16/23* | (2019.01) | |
| *G06F 12/14* | (2006.01) | |
| *G06F 12/0873* | (2016.01) | |
| *G06F 12/0831* | (2016.01) | |
| *G06F 11/14* | (2006.01) | |

(52) U.S. Cl.
CPC ...... *G06F 11/1446* (2013.01); *G06F 12/0831* (2013.01); *G06F 12/1491* (2013.01); *G06F 12/0873* (2013.01); *G06F 16/2343* (2019.01); *G06F 16/24552* (2019.01); *G06F 2212/621* (2013.01)

(58) Field of Classification Search
CPC ............ G06F 12/1491; G06F 12/0831; G06F 16/2343; G06F 16/24552; G06F 12/0873; G06F 2212/621
See application file for complete search history.

(56) References Cited

U.S. PATENT DOCUMENTS

| | | |
|---|---|---|
| 6,128,707 A | 10/2000 | Arimilli et al. |
| 6,173,377 B1 | 1/2001 | Yanai et al. |
| 6,502,205 B1 | 12/2002 | Yanai et al. |
| 6,625,705 B2 | 9/2003 | Yanai et al. |
| 6,910,212 B2 | 6/2005 | Brenner et al. |
| 7,055,059 B2 | 5/2006 | Yanai et al. |
| 7,171,539 B2 | 1/2007 | Mansell et al. |
| 7,240,238 B2 | 7/2007 | Yanai et al. |
| 7,243,194 B2 | 7/2007 | Daly, Jr. et al. |
| 7,305,534 B2 | 12/2007 | Watt et al. |
| 7,340,573 B2 | 3/2008 | Watt |
| 7,366,866 B2 | 4/2008 | Cochran et al. |
| 7,398,361 B2 | 7/2008 | Gunna et al. |
| 7,461,218 B2 | 12/2008 | Muthrasanallur et al. |
| 7,487,367 B2 | 2/2009 | Belnet et al. |
| 7,647,443 B1 | 1/2010 | Chatterjee et al. |
| 7,934,062 B2 | 4/2011 | McKenney et al. |
| 8,004,884 B2 | 8/2011 | Franceschini et al. |
| 8,108,533 B2 | 1/2012 | Siress et al. |
| 8,132,047 B2 | 3/2012 | Bauer et al. |
| 8,271,667 B2 | 9/2012 | Hoshino et al. |
| 8,332,842 B2 | 12/2012 | Bauer et al. |
| 8,463,813 B2 | 6/2013 | Siress et al. |
| 8,606,755 B2 | 12/2013 | Cohen et al. |
| 8,620,866 B2 | 12/2013 | Fitzpatrick et al. |
| 9,037,791 B2 | 5/2015 | Benhase et al. |
| 9,535,856 B2 | 1/2017 | Coronado et al. |
| 2004/0073831 A1 | 4/2004 | Yanai et al. |
| 2004/0143714 A1 | 7/2004 | Watt |
| 2004/0143720 A1 | 7/2004 | Mansell et al. |
| 2004/0170046 A1 | 9/2004 | Belnet et al. |
| 2004/0177261 A1 | 9/2004 | Watt et al. |
| 2004/0177269 A1 | 9/2004 | Belnet et al. |
| 2005/0097290 A1 | 5/2005 | Cochran et al. |
| 2006/0005074 A1 | 1/2006 | Yanai et al. |
| 2006/0179185 A1 | 8/2006 | Daly, Jr. et al. |
| 2007/0050564 A1 | 3/2007 | Gunna et al. |
| 2007/0299861 A1 | 12/2007 | Winter et al. |
| 2008/0086594 A1 | 4/2008 | Chang et al. |
| 2008/0098311 A1 | 4/2008 | Delarue et al. |
| 2009/0089695 A1 | 4/2009 | Baier et al. |
| 2010/0125556 A1 | 5/2010 | Bauer et al. |
| 2010/0125841 A1 | 5/2010 | Bauer et al. |
| 2011/0197246 A1 | 8/2011 | Stancato et al. |
| 2013/0275472 A1 | 10/2013 | Siress et al. |
| 2015/0242339 A1 | 8/2015 | Coronado et al. |
| 2016/0378378 A1 | 12/2016 | Coronado et al. |

OTHER PUBLICATIONS

Carlane et al., "Multiprotocol Data Access with IBM System Storage N Series", IBM Redbooks Paper, pp. 1-50, © Copyright IBM Corp. 2006.

IBM, "Fine Granularity Locking to Support High Data Availability in a Client/Server Database Management System", ip.com Prior Art Database Technical Disclosure, ip.com No. IPCOM000114843D, (Original Publication: Feb. 1, 1995, TDB v38 n2 02-95 p. 143-146), Published Online Mar. 30, 2005, 5 pages. http://ip.com/ipcom/000114843.

Liu et al., "Hybrid SSD with PCM", Jan. 23, 2012, 2011 11th Annual Non-Volatile Memory Technology Symposium Proceeding, pp. 1-5.

Nita, S., "Moneta Phase-Change SSD Is Up to 7x Faster than Its NANO Counterparts", Jun. 6, 2011, pp. 1-6.

Caulfield et al., "Moneta: A High-performance Storage Array Architecture for Next-generation, Non-volatile Memories", 2010 43rd Annual IEEE/ACM International Symposium on Microarchitecture, Dec. 2010, pp. 1-11.

Anonymous, "Phase change memory-based 'moneta' system points to the future of computer storage", Jun. 2, 2011, pp. 1-3.

Webopedia, "Phase Change Memory (PCM)", Jan. 29, 2013, pp. 1-2.

Margaret Rouse, "phase-change memory (PCM)", May 31, 2012, pp. 1-13.

Behrman, M., "Solid State Drives Are About to Get 7x Faster if Phase-Change Memory Catches on", Jun. 3, 2011, pp. 1-3.

Qureshi et al., "Improving Read Performance of Phase Change Memories via Write Cancellation and Write Pausing", Apr. 1, 2010, pp. 1-11.

QUEUING READ REQUESTS BASED ON WRITE REQUESTS

STATEMENT REGARDING PRIOR DISCLOSURES BY THE INVENTOR OR JOINT INVENTORS

A document entitled "Apparatus and Device for Host Read all the Time" was published anonymously on IP.com on Nov. 3, 2013. The subject matter of this document was created by the inventors of this Application and was published less than one year prior to the priority date of this application. Accordingly this document is a Grace Period Disclosure under 35 U.S.C. § 102(b)(1)(A).

BACKGROUND

The present disclosure relates to storage management, and more specifically, to storage management of local devices in tiered systems.

A data storage system may have one or more storage tiers in one or more storage devices. Tiered storage is a data storage environment consisting of two or more kinds of storage delineated by differences in at least one of these four attributes: price, performance, capacity and function. Any significant difference in one or more of the four defining attributes may be sufficient to justify a separate storage tier.

The data storage system may include storage tiers on a client computer. For instance, the client computer may have a local storage tier that is accessed by a tiered storage controller in order to reduce access times for the client computer for data in the data storage system.

Extents may be managed on tiered storage. An extent is a contiguous area of storage in a computer file system, reserved for a file. When a process creates and writes data to a file, file-system management software allocates a whole extent. When resuming a write to the file, possibly after doing other write operations, the data continues where the previous write left off. This may reduce or eliminate file fragmentation and possibly file scattering too. An extent-based file system (i.e., one that addresses storage via extents rather than in single blocks) need not require limiting each file to a single, contiguous extent.

SUMMARY

Embodiments of the present disclosure may relate to methods and a computer program product for allowing writes based on a granularity level.

One embodiment relates to a method for a storage server. The method includes receiving a received granularity level for a particular volume of a storage device of a client computer including an effective duration for the received granularity level. The method includes receiving an anticipated write to the particular volume at an anticipated write granularity level. The method includes verifying whether the anticipated write granularity level substantially matches the received granularity level at the effective duration. The method also includes writing, in response to the anticipated write granularity level substantially matching the received granularity level at the effective duration, the anticipated write to the particular volume for the received granularity level.

Another embodiment relates to a method for a client computer. The method includes providing write access permission to a particular volume of a storage device to a storage controller, wherein the storage device is communicatively coupled to a storage controller. The method includes receiving an anticipated write notification from the storage controller of an anticipated write to an initial record on the particular volume. The method includes determining a granularity level for the anticipated write. The method includes storing, in response to receiving the anticipated write notification, a backup of the initial record at the determined granularity level. The method includes receiving a write hardened notification from the storage controller. The method also includes receiving, responsive to receiving a write hardened notification, a hardened record.

Another embodiment relates to a computer program product. The computer program product is configured to receive a received granularity level for a particular volume of at least one storage device including an effective duration for the received granularity level. The computer program product is configured to receive an anticipated write to the particular volume at an anticipated write granularity level. The computer program product is configured to verify whether the anticipated write granularity level matches the received granularity level at the effective duration. The computer program product is configured to write, in response to the anticipated write granularity level substantially matching the received granularity level and the effective duration, the anticipated write to the particular volume for the received granularity level.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
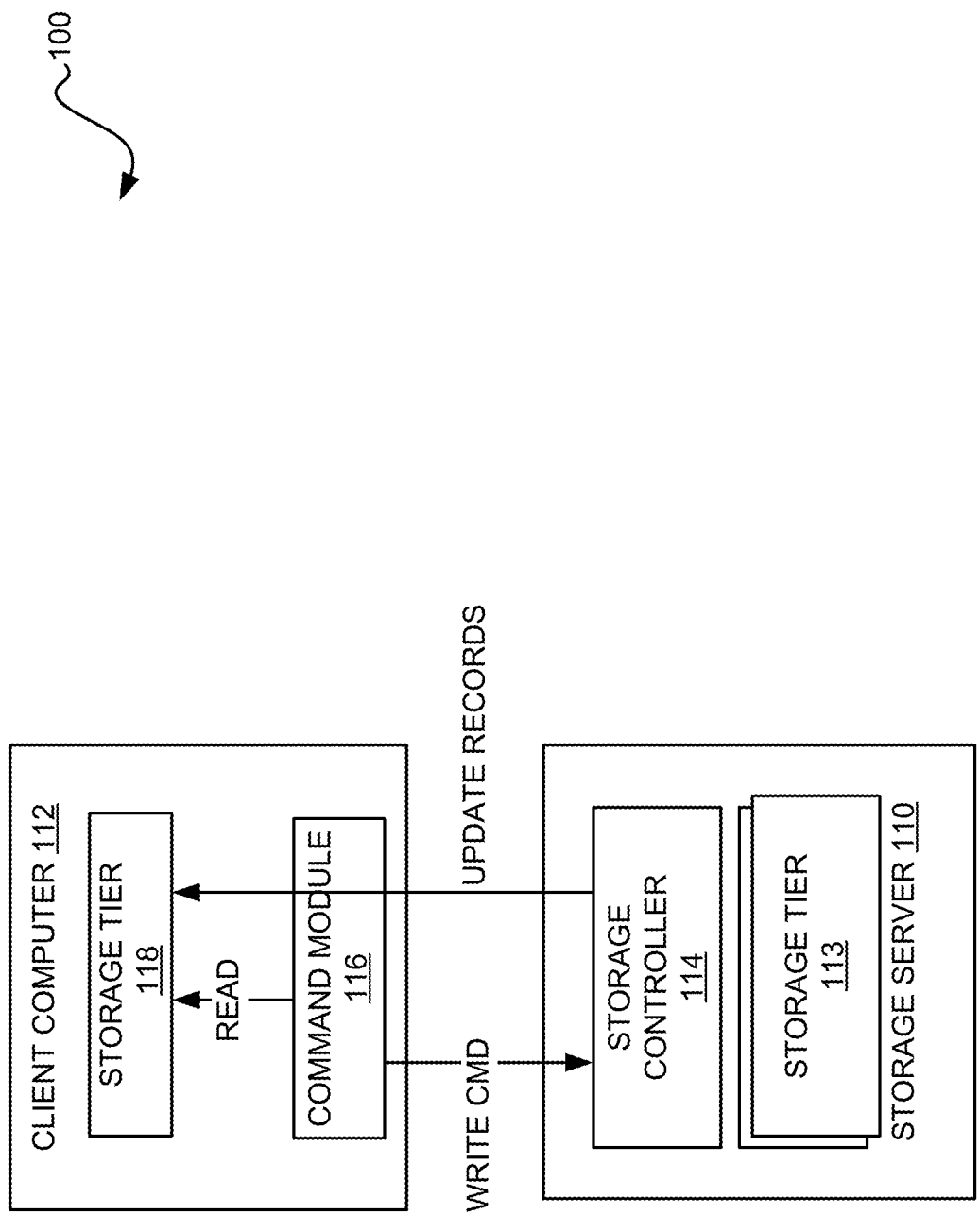
FIG. 1 illustrates a storage system configured to access a storage device on a client computer, according to various embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

DETAILED DESCRIPTION

Aspects of the present disclosure relate to storage management, more particular aspects relate to storage management of writes in local storage devices. For instance, aspects of the disclosure applies to a volume on a tiered local storage device on a client computer. A storage controller, independent of the client computer, receives a granularity level for a local storage device. The storage controller notifies the client computer of an anticipated write, i.e. a planned write, to the volume which may include a planned change of an initial record or initial write on the volume. The storage controller verifies whether the granularity level for the anticipated write is within the received granularity level. If so, then the storage controller hardens the write, i.e., updates the initial record. While the present disclosure is not necessarily limited to such applications, various aspects of the disclosure may be appreciated through a discussion of various examples using this context.

A common practice may involve installing Solid State Drives (SSD) on servers for quick access to frequently used data. The servers contain cache management software to cache data for immediate access. This data may also be written to external disk storage like IBM™ D58000® family, etc. The writing of external disk storage may create additional cost and data management issues for customers with the purchase and management of SSD as well as administrative activities to ensure the data is also copied to external storage to keep data synchronized.

Storage controllers, that are part of storage servers like the IBM™ D58000® family, may allow storage tier management systems such as Easy Tier® to be extended from the storage controller to a client computer. The client computer may contain software that allows a client computer storage device, e.g., an SSD, to serve as a fast access tier of a multi tier storage device. The client computer storage device serving as a fast access tier of a multi-tier storage device may use statistics from both the client computer and the storage controller to decide which volume data may be contained within the client computer for faster reads. Download of the statistics from the client computer to the storage controller may require movement of data. Once the storage controller analyzes the statistics, it may determine whether data should be sent to the client computer for immediate access.

Additional steps may be required to ensure fast read access of data at the client computer level. Granularity levels are logical subsets of data, e.g., which may range from a volume to an extent. The logical subsets may also be referred to as logical storage units. By defining granularity levels within the data, read data may be cached on the client computer and access to the underlying storage may be bypassed until such a time as the data becomes cold or a write to the storage device occurs. However, in order to protect against accessing stale read data, the design may require polling for changes in the underlying storage and accessing storage when a change is detected.

Solutions may address the problem of overhead to allow the data to be read from the client computer, however the read may be restricted to the volume level. This may mean that any changes at the volume level are propagated to the client computer. The client computer may not be interested in getting all the data changed in the volume but rather would prefer just segments or blocks of data at smaller granularity levels to increase performance. Aspects of the present disclosure may address the problem of the level of granularity of propagated data to the client computer.

FIG. 1 illustrates a storage system 100 configured to access a storage device on a client computer 112, according to various embodiments. The storage system 100 has a storage server 110. An example of the storage server 110 may include the IBM™ DS8000®, but other storage servers are envisioned. The storage server 110 may have one or more storage tiers 113 and a storage controller 114. The one or more storage tiers 113 may include a mixture of high performance, fast-access storage devices and lower performance, slower-access storage devices.

The storage controller 114 may be a controller mechanism in the storage system 100 that manages one or more storage tiers 113. The storage controller 114 may be modified to perform aspects of the disclosure. The storage controller 114 may be configured to read and write, and control the storage tier 113 and storage tier 118 on the client computer 112. Examples of storage controllers 114 may include the IBM™ Easy Tier System®, but other storage controllers are envisioned. In the system 100, the storage controller 114 may access the lower-level storage tier 113.

The storage tier, e.g., 113, may be a storage device, such as an enterprise hard drive or a serial advanced technology attachment. The storage tier, e.g., 113, may also refer to a storage tier that has a lower relative performance, e.g., slower access time, than another storage tier, e.g., 118. In various embodiments, the storage tier, e.g., 113, may be another SSD with a lower relative performance to another storage tier. The storage tier, e.g., 113, may be on the storage server 110 while another storage tier, e.g., 118, may be located on the client computer 112.

The storage controller 114 may be configured to update the records on the storage tier 118 on the client computer 112. In various embodiments, the storage tier 118 may have either a higher or lower relative performance than the storage tier 113. The storage controller 114 may have to interact with the command module 116 on the client computer 112. The command module 116 may be a localized controller for the storage tier 118. In various embodiments, the command module 116 may perform aspects of the disclosure. The command module 116 may be configured to read and write data stored on the storage tier 118 for when the client computer 112 requests local access. The command module 116 may also forward write requests from the client computer 112 to the storage controller 114 on the storage server 110.

The storage device containing the storage tier 118 may communicatively couple to the storage server 110. In various embodiments, the storage tier 118 may be viewed as a part of the storage server 110. The client computer 112 may surrender control of the storage tier 118 to the storage server 110. To maintain data integrity, the storage server 110 may control the writing of the storage tier 118 while the client computer 112 may perform read actions on the storage tier 118 when data and records within storage tier 118 need to be accessed by the client computer 112.

Figure 2:
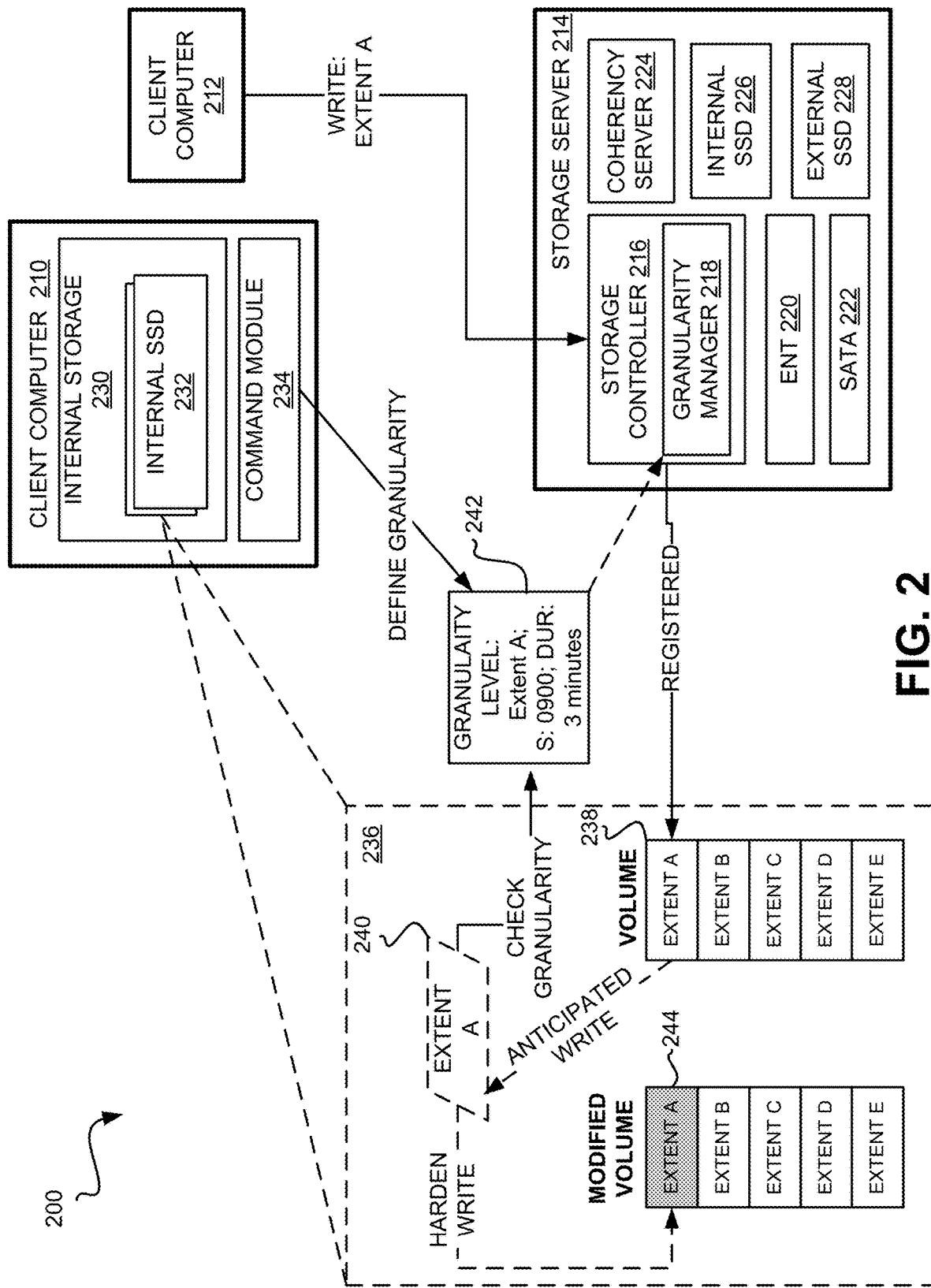
FIG. 2 illustrates a storage system that verifies granularity levels in order to write data to the client computer, according to various embodiments.

FIG. 2 illustrates a storage system 200 that verifies granularity levels in order to write data to the client computer, according to various embodiments. The storage system 200 may be configured to write to a defined granularity level. The storage system 200 may have one or more client computers, e.g., client computer 210 and client computer 212. The storage system 200 may have a storage server 214. The storage server 214 and the client computer 210 may be configured in a similar manner to the storage server 110 and the client computer 112, respectively, from FIG. 1.

In various embodiments, the storage server 214 may receive a write request from a client computer, e.g., 212. The write request may originate from an entity different than client computer 210. Even though client computer 212 is shown as initiating the write request, the write request may originate from any entity with write permission. The write request may be a request to modify an initial record on a storage device, e.g., 232. The initial record may be the last changed record. In various embodiments, this may be the record with the latest timestamp associated with a change. The initial record may be modified by an anticipated write, according to various embodiments. According to various embodiments, an anticipated write may be a planned write. The planned write may be a write to the initial record that is pushed onto the storage device and may be referred to as push access. This push access to a granularity level on the storage device may also be quiesced.

The storage server 214 may have a storage controller 216 to control the writes to the managed drives. The managed drives may include the enterprise hard drive (ENT) 220, the serial advanced technology attachment hard drive (SATA) 222, an internal SSD 226, and an external to the storage server SSD 228. In various embodiments, the external SSD 228 may also include an SSD resident on a client computer, e.g., 210.

The storage server 214 may also have a coherency server 224. The coherency server 224 may manage how data is placed onto internal flash caches on the attached client computers. The coherency server 224 may integrate with placement functions for the best optimization internal tiers, e.g., ENT 220, SATA 222, and internal SSD 226. The coherency server may asynchronously communicate with the client computer 210, 212 system (the coherency clients) and generates caching advice for each coherency client (not pictured).

The storage server 214 may also have a granularity manager 218. The granularity manager 218 may be responsible for receiving a defined granularity from the client computer 210. The granularity manager 218 may also be responsible for determining whether the granularity level of the data is the same as a defined granularity level before data is written to a storage tier on the client computer 210 by the storage controller 216.

The client computer 210 may include one or more internal storage devices 230. The internal storage device 230 may be used by the client computer 210 for either networked or local storage. The internal storage device 230 may also include one or more internal SSDs 232. The internal SSDs 232 may be part of a tiered storage system, in particular a high-level storage tier, i.e., a fast-access storage tier. In various embodiments, the internal SSD 232 may include a cache to temporarily hold anticipated writes before they are hardened as discussed herein. Although reference is given to an internal SSD 232, other configurations are contemplated. For example, it may be possible for random access memory to be used as a fast access storage device.

The client computer 210 may also include a command module 234. The command module 234 may perform data processing actions for the internal storage devices 230 including local file writing and reading. A system policy may force the storage controller 216 to relay all read and write commands to the tiered storage, e.g., 230, through the command module 234. In various embodiments, the command module 234 may relay the granularity level, which is defined by the client computer 210, to the granularity manager 218.

The command module 234 may transmit one or more granularity factors 242 from the client computer 210 to the granularity manager 218. The granularity factors 242 may include a granularity level, a start time, and a duration for the granularity. The start time and duration may also be referred to as an effective duration since the effective duration may define when the granularity level is in effect. According to various embodiments, the effective duration may include more than the start time and duration.

The granularity manager 218 may compare an anticipated write, such as that originated with client computer 212, with the defined granularity level and, if the anticipated write has the same granularity level as the granularity manager 218, then harden the write. An anticipated write notification from the storage controller 216 may be a notification that is sent to the client computer 210 that alerts the client computer 210 of an anticipated write on the storage server 214. The client computer 210 may backup the initial record in response to receiving the anticipated write notification, according to various embodiments.

The storage controller 216 may modify the internal SSD 232 as shown in box 236. Box 236 illustrates an expanded view of the extent A write on an internal SSD 232. To illustrate the concepts of the storage system 200, a write of an extent A may be illustrated. The storage controller 216 may receive a request to write or, rather, update the records of extent A from the client computer 212. The extent A may have one or more records within the extent file structure. The storage controller 216 may determine whether the volume, e.g., the volume on the SSD 232, that hosts extent A and extent E is registered. If the volume is not registered, then the storage controller 216 may not write to the volume. In various embodiments, an unregistered volume may be automatically registered to the storage controller 216.

If the volume is registered, then the storage controller 216 may locate an initial record of extent A 238. Once located, the storage controller 216 may notify the client computer 210 of the anticipated, i.e., planned, write to the initial record 238. According to various embodiments, during an anticipated write, the storage controller 216 may flag the initial record 238 as having a write associated with it, whether or not the write/update was actually performed.

After the anticipated write notification is sent to the client computer, the initial record 238 may become an anticipated record 240, according to various embodiments. An anticipated write may refer to an instruction to change the initial record into the anticipated record 240. In various embodiments, the data in the anticipated record 240 and a hardened record 244 may be identical. The hardened write may refer to an instruction to commit the anticipated record 240 into the internal SSD 232. In various embodiments, the hardened write may refer to an instruction to commit the anticipated write into the internal SSD 232, since the anticipated write refers to instructions to change an initial record.

Granularity factors 242, including the received granularity level, may be received from the client computer 210. The granularity manager 218 may verify that the granularity level of the anticipated write, i.e., the anticipated write granularity level is the same as or substantially the same as a granularity level allowed by the client computer 210, e.g., granularity factors 242.

In various embodiments, the granularity factors 242 may define a level of granularity based on the data from client computer 212. For example, the granularity factors 242 may indicate that the granularity level is an extent, specifically extent A. The effective duration of the granularity factors 242 may also indicate that the start time is 0900 and the duration is 3 minutes for the particular granularity. The effective duration, e.g., the start time and the duration time, may be different for a subset of the received granularity level. For example, if the received granularity level specified a particular volume, then the subset of the granularity level may be an extent. The extent may have a different effective duration, e.g., a shorter duration, than the volume. In various embodiments, a less specific granularity level may be established, e.g., a volume, block of contiguous data, rank, an extent pool, through an extent.

According to various embodiments, the granularity level may apply to only the level of granularity that is registered with the client computer. For example, if extent A is specified, then only changes to extent B will not be allowed by the granularity manager 218. The granularity level may apply to a read. The granularity level may also indicate specific types of extents to write. For example, if the client computer 210 has an internal SSD 232 with a volume size of 10 Gigabytes (GB), and the storage server 214 defines an extent as 1 GB. If a client computer 210 registers only the odd extents of the volume, meaning extents 1, 3, 5, 7, 9, then when one of these extents is modified, the client computer 210 is told to update the read data contained on the extents. If the client computer 212 writes to an even number extent, e.g., 0, 2, 4, 6, or 8, then the client computer 210 does not get informed of the write to the even extents.

The granularity level may act as a write permission, according to various embodiments. For example, updates to extent E may not be able to occur because the entire volume is not defined as a granularity level. Therefore, changes to both extent A and extent E require that the granularity level encompass both granularities. For example, if extent A and extent E were part of the same extent pool, then a granularity level of an extent pool would allow both extent A and extent E to be written along with the entire extent pool. In various embodiments, the extent pool would have to be updated as an entire block of data if the granularity level is defined as an extent pool.

The granularity manager 216 may check the anticipated record 240 against the granularity factors 242. In this circumstance, the granularity manager 216 may determine that the anticipated write granularity level is within the received granularity level and allow the anticipated record 240 to have a harden write to be a hardened record 244.

Reference is made to hardening an anticipated record 240 throughout the disclosure. The hardening may refer to a commitment on the part of the storage controller 216 to make the anticipated, i.e., planned, write committed into storage. Hardening the write may allow the anticipated write to occur. In various embodiments, the hardening of the write and writing to the storage tier may be the same action. Hardening the write and hardening the record may refer to the same action. The hardening of the write may trigger a write hardened notification by the storage controller 216. The write hardened notification may be a notification to the client computer 210 that the anticipated record 240, has hardened, i.e., been committed. The write hardened notification may be transmitted to the client computer 210 and the client computer 210 may take a number of actions, e.g., resuming any queued reads or discard any stale data. The hardened write may also refer to a hardened record 244, according to various embodiments. The hardened record 244 may be the record saved to the internal SSD 232 of the client computer 210. In various embodiments, the initial record 238 may be saved as a backup by the client computer 210.

Figure 3:
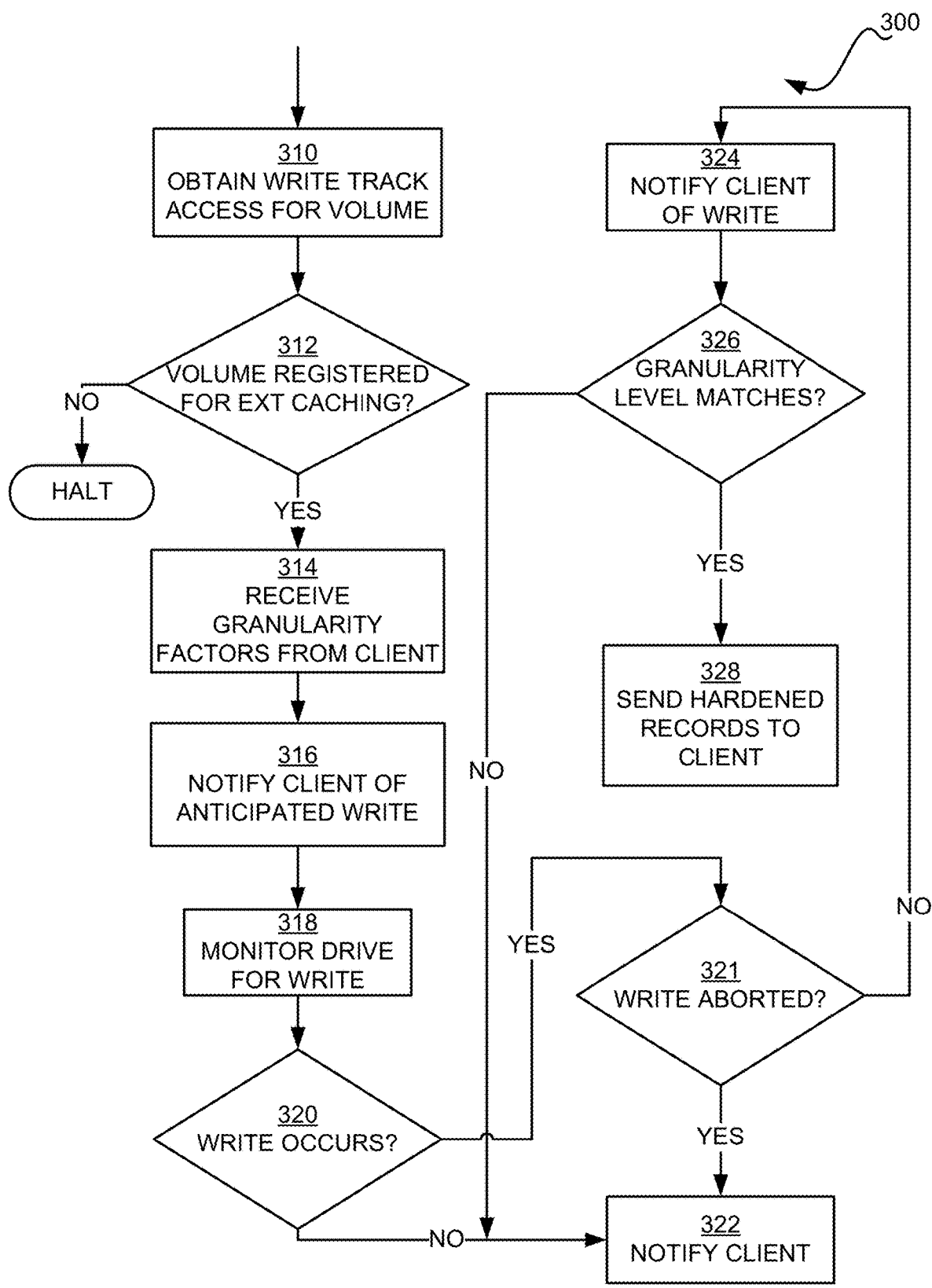
FIG. 3 illustrates a flowchart of a method for verifying the granularity level of data on a storage controller of a storage server, according to various embodiments.

FIG. 3 illustrates a flowchart of a method 300 for verifying the granularity level of data on a storage controller of a storage server, according to various embodiments. The storage controller may be communicatively coupled to a storage device on a client computer. The storage controller may ensure that the granularity level matches for a write on the tiered storage device. The method 300 may begin at operation 310.

In operation 310, a storage controller may obtain write track access for a volume. The write track access may allow the storage controller to write to the volume on the client computer. The write track access may be the same as write access permissions and push access (where data from the storage controller is pushed onto the storage device), according to various embodiments. In various embodiments, the write track access may be assigned to the storage controller by a client computer. The write track access may also be requested for the particular storage device. After the write track access is obtained, then the method 300 may continue to operation 312.

In operation 312, the storage controller may determine whether the volume is registered for external caching. External caching allows the volume on the storage device on the client computer to receive data from the storage controller. In various embodiments, operation 310 and 312 may occur simultaneously. If the volume is not registered for external caching, then the method 300 may halt. In various embodiments, if the volume is not registered for external caching, the storage controller may wait for the volume to become registered or may initiate a request to register the volume. If the volume is registered for external caching, then the method 300 may continue to operation 314.

In operation 314, the storage controller may receive granularity factors from the client. The granularity factors may include the granularity level, the start time of the granularity level, and the duration of the granularity level, as discussed herein. According to various embodiments, more or fewer granularity factors may be in effect. The granularity factors may be also received by components of the storage controller, including the granularity manager, in any particular order. For example, it may be possible for the granularity manager to receive the granularity factors directly without going through the storage controller. The granularity level may also refer to specific data blocks, e.g., specific extents that are allowed to be written. The duration of the granularity level may be particularly useful when performing operations during specific times, e.g., slow periods such as the evening. Once the granularity factors are received, then the method 300 may continue to operation 316.

In operation 316, the storage controller may notify the client computer of an anticipated write. In various embodiments, the anticipated write may be a notification that a write is about to occur. The anticipated write may also be a set of instructions to change an initial record. According to various embodiments, the anticipated write may occur when a storage controller has identified the data to update. The anticipated write may occur first in a cache area of the storage device and then may later be committed. The notification of the client computer allows the client computer to take the corrective actions, e.g., queue outstanding reads, make a copy of the track, etc. After the client is notified, the method 300 may continue to operation 318.

In operation 318, the storage controller may monitor the storage device for a write, e.g., a hardened write, to the particular data identified in operation 316. In various embodiments, during the monitoring for a write, the storage controller may wait to receive permission from the client computer to write the data. After the storage controller monitors the storage device, then the method 300 may continue to operation 320.

In operation 320, the storage monitor may determine whether a write occurs. A write may occur when the storage controller hardens the anticipated write to create a hardened record in the storage device. In various embodiments, the write may not occur due to a change in the anticipated record. For example, if the anticipated record relies on another data processing operation, and the data processing operation fails, then the storage controller may not harden the write. In another example, the write may not harden because of a storage device failure. If the write does not occur, then the storage controller may notify the client in operation 322. The notification may be an alert or visual communication to the client computer.

The write to the storage device may occur when the storage system commits to the write. In various embodiments, the term "harden" may be used to refer to the commitment of the write by the storage controller. If the write occurs, then the storage controller may determine whether the write was aborted in operation 321. The write may be aborted due to a number of factors such as insufficient space or resources, or user abort. If the write is aborted, then the method 300 may continue to operation 322 where the client is notified. After the write abort is determined not to have occurred, then the method 300 may continue to operation 324.

In operation 324, the storage controller may notify the client of the write. Once notified of the write, then the client computer may take a number of actions, e.g., saving backup copies of the data. Concurrently or after notifying the client computer of the write, the method 300 may continue to operation 326.

In operation 326, the storage controller may verify that the anticipated write granularity level is within the relieved granularity level from the client. If the anticipated write granularity level matches the granularity level from the client, then the granularity levels will match. For example, if the write is to three extents within the same volume but not the same extent pool, and the granularity level is defined as an extent pool, then the granularity level would not match. However, for the same write, if the granularity level is defined as a volume, then the granularity level would match. If the granularity level does not match, then the method 300 may continue to operation 322 where the client computer is notified.

In various embodiments, the granularity level from the client and the anticipated write granularity level may substantially match. Substantially matching includes being within an error of margin for the matching. For example, if the application specifies that the error of margin for a match is an extent, then the granularity levels may match if the granularity level from the client computer is two extents but the anticipated write granularity level is one extent. If the granularity level does match, then the method 300 may continue to operation 328.

In operation 328, the storage controller may send the hardened records from the write, to the client computer. The hardened record may be the initial record that is modified by the anticipated write and stored in the storage device. The prior copies of the initial record may also be sent to the client computer. In various embodiments, the order of operations 318-328 may be modified. For example, it may be possible for the granularity level check of operation 326 to be performed for the anticipated write instead of the hardened write.

The storage server may also be responsive to a quiesce granularity level command, discussed herein. If the storage server receives a quiesce granularity level command, then the storage server may halt the verification of the granularity level received from the client computer. With the absence of verification, then the method 300 may automatically send hardened records to the client computer. In various embodiments, the anticipated write may occur automatically.

Figure 4:
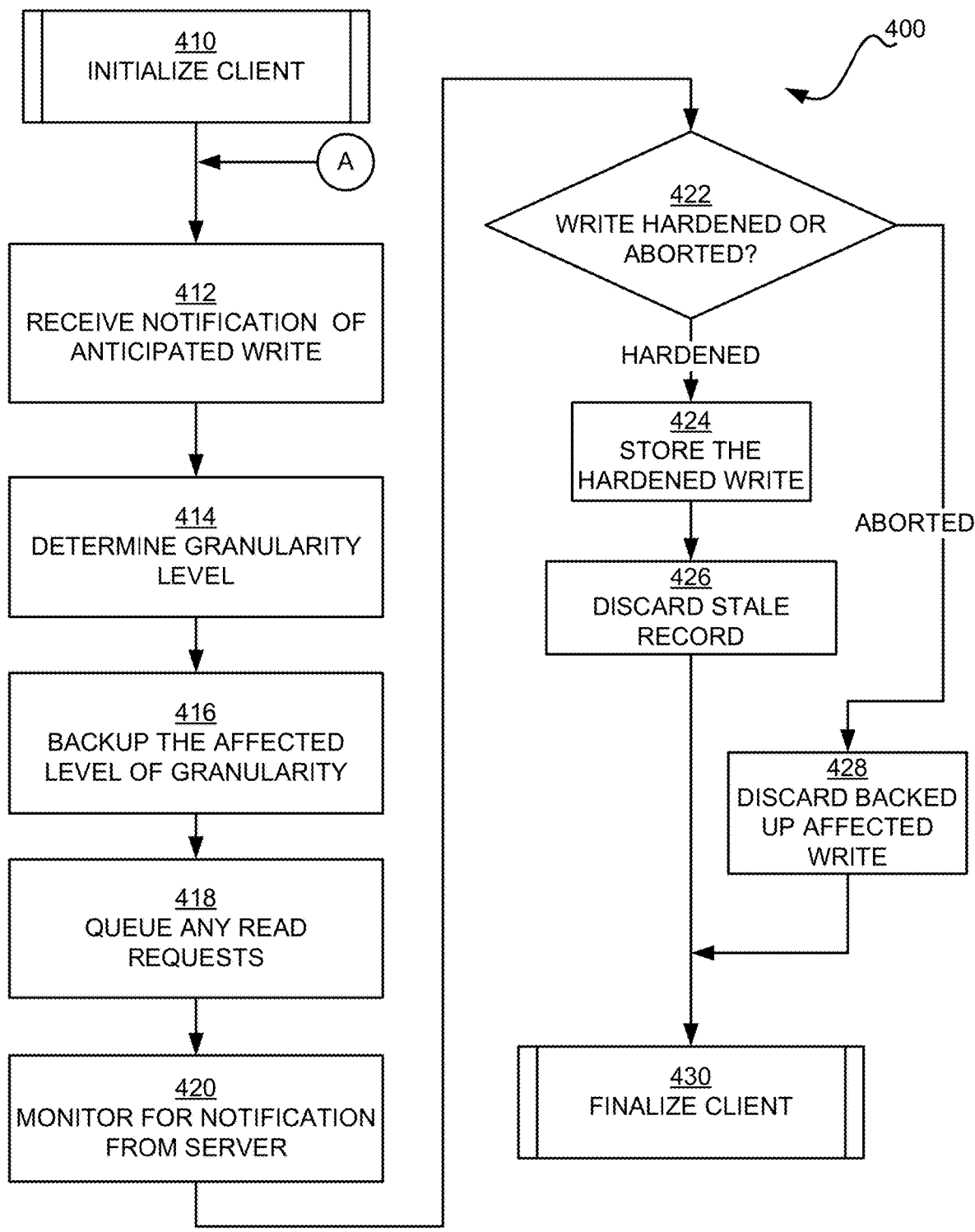
FIG. 4 illustrates a flowchart of a method of using granularity levels on a client computer, according to various embodiments.

FIG. 4 illustrates a flowchart of a method 400 of using granularity levels on a client computer, according to various embodiments. The client computer may have components, such as the command module, or a local storage tier storage controller that may facilitate aspects of method 400. Certain aspects of the disclosure may be illustrated by operations discussed herein. The method 400 may begin at operation 410.

In operation 410, the client computer may be initialized. The initialization may involve a series of operations to allow the storage device on the client computer to act as part of a tiered storage system using the storage server. During the initialization, the granularity level may be set by the client computer, and the volume registered to the storage controller. The storage controller may be set up as the initiator and the client computer as the target. At this point, write access permission may also be given to the storage controller. The write access permission may allow a storage controller to access a storage device on the client computer. In various embodiments, the client computer may also request to the storage server that a write be performed on an initial record. Once the client computer is initialized, then the method 400 may continue to operation 412.

In operation 412, the client computer may receive notification from the storage controller of the anticipated write. The anticipated write notification may correspond to the sending the notification from operation 316 from FIG. 3. The anticipated write is further discussed herein. Once the notice of the anticipated write is received, then the method 400 may continue to operation 414.

In operation 414, the client computer may determine the granularity level of the anticipated write. For example, if the anticipated write is within an extent pool, including multiple extents within the extent pool, then the granularity level may be determined to be at the extent pool level. If the anticipated write is for multiple extents in multiple extent pools, then the granularity level may be a volume. Once the granularity level of the anticipated write is determined, then the method 400 may continue to operation 416.

In operation 416, the client computer may backup the affected level of granularity. For example, if the level of granularity for the anticipated write is an extent pool, then the client computer may backup the extent pool on the storage device. During the backup, the client computer may save and store the initial record of the data. The client computer may keep a copy of the backed up extent pool with the initial record(s) on a cache or may store the extent pool on the storage device. Once the affected level of granularity is backed up, then the method 400 may continue to operation 418.

In operation 418, the client computer may queue any read requests from the client or the storage controller. For example, a client computer may request to read an internal storage device that is controlled in part by the storage server. In various embodiments, the read requests may be queued for any accessing entity, including entities other than the client or storage controller. These read requests may ordinarily be granted immediately by the storage device or command module of the client computer. However, by queuing the read requests, the client computer may wait for the data on the storage device to update. After the read requests are queued, the method 400 may continue to operation 420.

In operation 420, the client computer may monitor for a notification from the storage server that the data has been either hardened or aborted. In various embodiments, the client computer may passively wait for notification from the storage controller. The client computer may also actively send requests to the storage controller for status. The client computer may determine whether the write has been hardened or aborted in operation 422. If the anticipated write is aborted, then the method 400 may continue to operation 428. If the anticipated write is hardened, then the method 400 may continue to operation 424. The client computer may receive a write hardened notification from the storage controller.

In operation 424, the client computer may store the hardened write. Once the write is hardened, the data may be stored on the storage device of the client computer. In various embodiments, the client computer may be configured to accept the hardened write by accepting the hardened record into the drive. For example, the storage device on the client computer may be configured to determine if the hardened record is different than the initial record. If so, then the storage device may receive the hardened record. The backup write from operation 416 may be saved, according to various embodiments. The backup write may be saved as the N−1 or the first level backup. The backup may be used in later restore operations if requested by the client computer.

After the hardened record and the backup record are stored, a stale record may be discarded in operation 426. The stale record may be a second level backup, i.e., a backup two changes ago. For example, if an initial record has an initial count attribute of 40 and the initial record is changed to a hardened record with a count attribute of 42 and then another write changes the count attribute again to 54, then the initial count attribute of 40 may be discarded by the client computer. The 42 count attribute may be saved. In various embodiments, the stale record may be the first level backup, i.e., where no backups are stored. In various embodiments, the stale record may be considered older than the hardened record. For example, the stale record may be a backup that was taken four writes ago. Since the most recent write is updated, then the stale record may be discarded. Once the stale record is discarded, then the method 400 may continue to operation 430.

In operation 428, the client computer may discard the backed up write, i.e. the backup of the initial record, at the affected level of granularity. The backed up write may be the initial record that was backed up at operation 416. After the backup write is discarded, then the method 400 may continue to operation 430.

In operation 430, the client computer may be finalized. The finalization may involve processing any of the queued read requests from operation 418. The finalization may also determine whether the granularity is quiesced. In various embodiments, a quiesce action may pause the effect of the granularity level and allow the client to use the storage device like a local drive.

The quiesce action may be initiated with a quiesce granularity level command. The quiesce granularity level command may originate from the client computer and be received by the storage server. The quiesce granularity level command may result in returning control of the particular volume, depending on the system preferences, to either the client computer locally or to the storage server in a multi-tier configuration. In various embodiments, the quiesce action may allow the storage controller to freely write to the storage device. For example, the storage controller may access the storage device like it was part of a tiered storage system. The storage controller may give the client computer read only access to the storage device.

The quiesce action may result in the client computer not getting notified of writes to the extents that were quiesced. For example, in a volume where the odd numbered extents, e.g., extent 1, 3, 5, 7, are specified in the granularity level, if a client computer specifies that extents 1, 5, and 7 are quiesced, then when the storage controller writes to these extents, then the client computer does not get notified. After the quiesce action is stopped, then the client computer gets notified.

If the granularity is not quiesced, then aspects of the method 400 may continue, for example, at reference A. Reference A may continue at operation 412.

Figure 5:
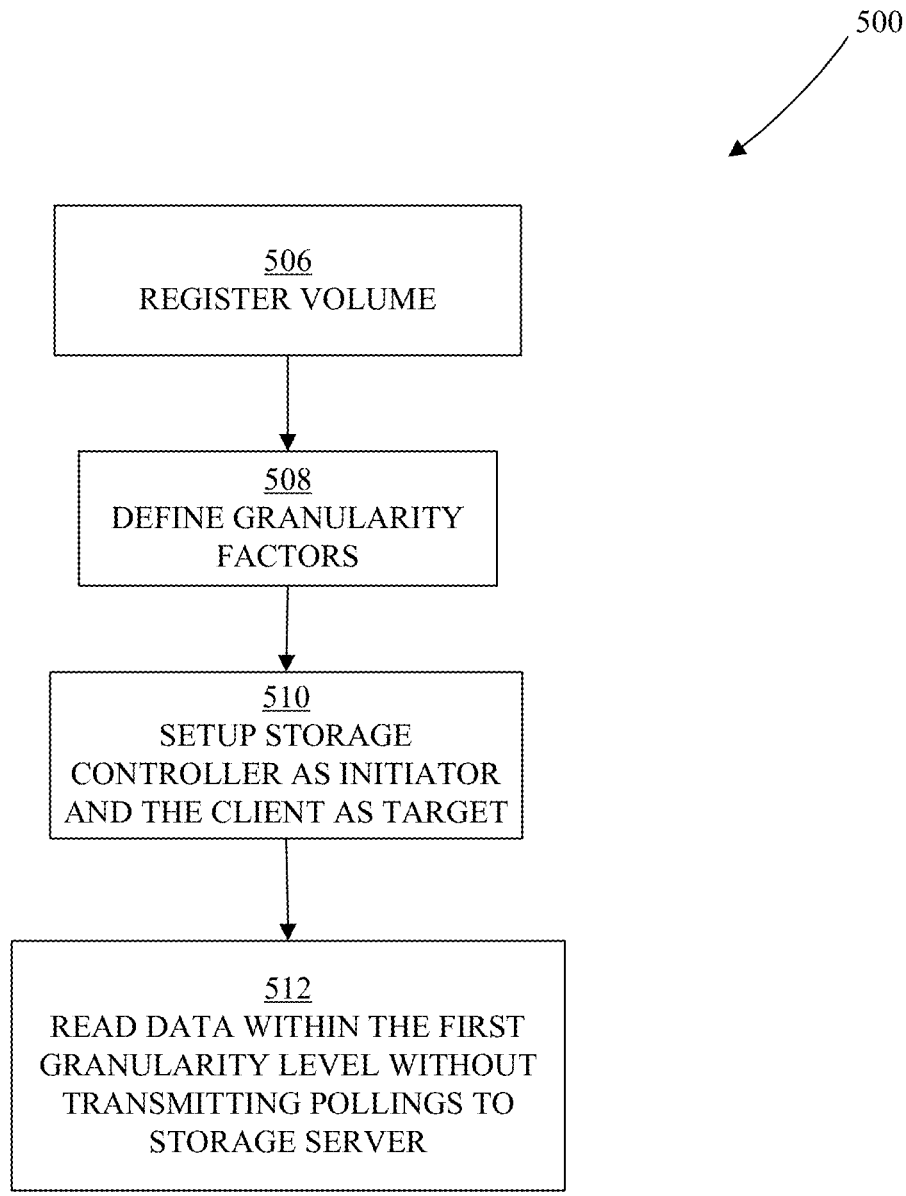
FIG. 5. illustrates a flowchart of a method for initializing a client computer using granularity levels, according to various embodiments.

FIG. 5. illustrates a flowchart of a method 500 for initializing a client computer using granularity levels, according to various embodiments. The method 500 may include configuring the client computer to allow the storage controller access to the storage device on the client computer. The method 500 may begin at operation 506.

In operation 506, the client computer may register the volume of the storage device. The volume may be registered so that the storage controller has access to the volume. In various embodiments, the registering may allow the storage controller a communication path to the volume of the storage device on the client computer. The client computer may allow access to the write track of the volume to the storage controller so that the storage controller may use the volume in a tiered storage system. In various embodiments, the storage device on the client computer may represent the highest tier available to the storage server with the fastest access time relative to other storage devices in the storage server. After the volume has been registered in operation 506, then the method 500 may continue to operation 508.

In operation 508, the client computer may define the granularity factors. The granularity factors may specify the granularity level, the start time, and the duration. Once defined, then the granularity factors may be transmitted to the storage controller in the storage server. After the granularity factors have been defined, then the method 500 may continue to operation 510.

In operation 510, the client computer may set up the storage controller as an initiator and the client computer as a target. The initiator may initiate communication of data to the target. Initially, the client computer may act as an initiator and discover the Logical Unit Numbers (LUNs) on the storage server, the target. Once the LUNs/volume discovery is completed, and the client computer has built its internal disk assignment, e.g., one disk per storage server LUN discovered, the client computer may communicate to the storage server which LUNs are to be registered. Once registration is completed, the storage server may use one or more ports to setup itself as an initiator and the client computer as a target. The storage server acting as initiator will not perform LUN discovery on the server, but rather may use the LUNs and the associated disks assigned previously. In various embodiments, the storage server does the LUNs discovery once and does not have to do the discovery again. Once the client computer is initialized, then the method 500 may continue, for example, in operation 412 of FIG. 4.

Figure 6:
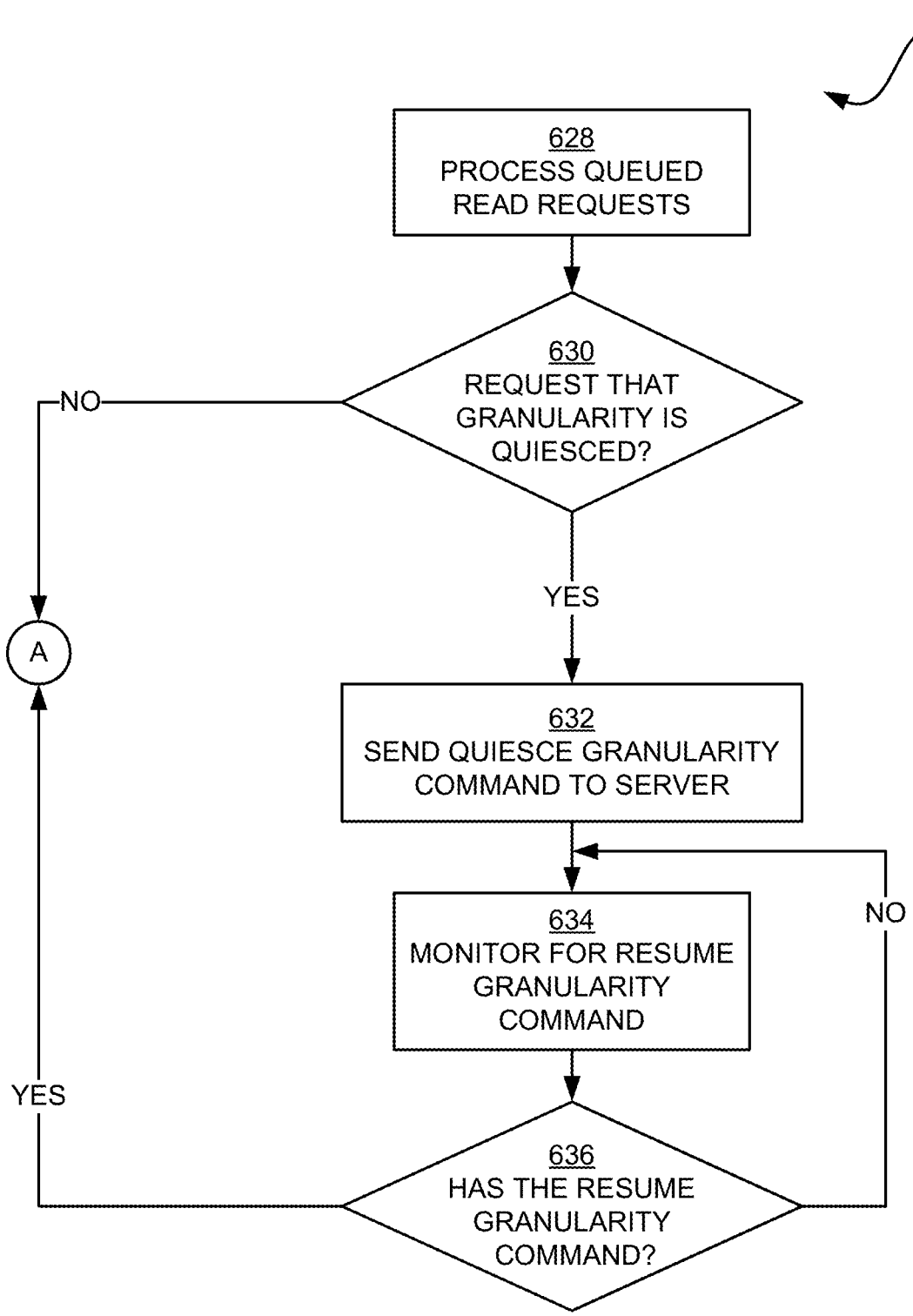
FIG. 6 illustrates a method of finalizing a client computer using the verification of granularity levels, according to various embodiments.

FIG. 6 illustrates a method 600 of finalizing a client computer using the verification of granularity levels, according to various embodiments. The method 600 may monitor for quiesce granularity level commands and resume the granularity level when signaled by a resume granularity level command. The method 600 may begin at operation 628.

In operation 628, the client computer may process queued read request. The read request may be queued from a previous operation, such as operation 418 in FIG. 4. Once the read requests are queued, then the method 600 may continue to operation 630.

In operation 630, the client computer may request that the granularity level is quiesced. In various embodiments, the request may originate from a client computer user. The request may also be based on a storage server policy. For example, the storage server policy may specify that granularity levels may be ignored during the working hours and automatically quiesce the granularity levels during that time. If there is not a request, then the method 600 may continue to reference A. Reference A may further continue to an operation where the granularity levels are monitored again, e.g., operation 412 of FIG. 4. If there is a request, then the method 600 may continue to operation 632.

In operation 632, the client computer may send a quiesce granularity level command to the storage server. The quiesce granularity level command may be an instruction or a series of instructions to temporarily suspend verifying the granularity levels on the storage server. The storage server may take appropriate actions, e.g., quiesce the granularity levels by stopping the checking of the granularity level of a write. Once the quiesce granularity level command is sent, then the method 600 may continue to operation 634.

In operation 634, the client computer may monitor for the resume granularity level command. The resume granularity level command may be an instruction or a series of instructions that indicates to the storage server to resume the granularity level checking of writes. In operation 636, the client computer may take the appropriate actions in response to the presence of the resume granularity level command. For example, if there is not a resume granularity level command, then the method 600 may continue to operation 634, where further monitoring for the resume granularity level command occurs. If there is a resume granularity level command, then the method 600 may continue to reference A.

Figure 7:
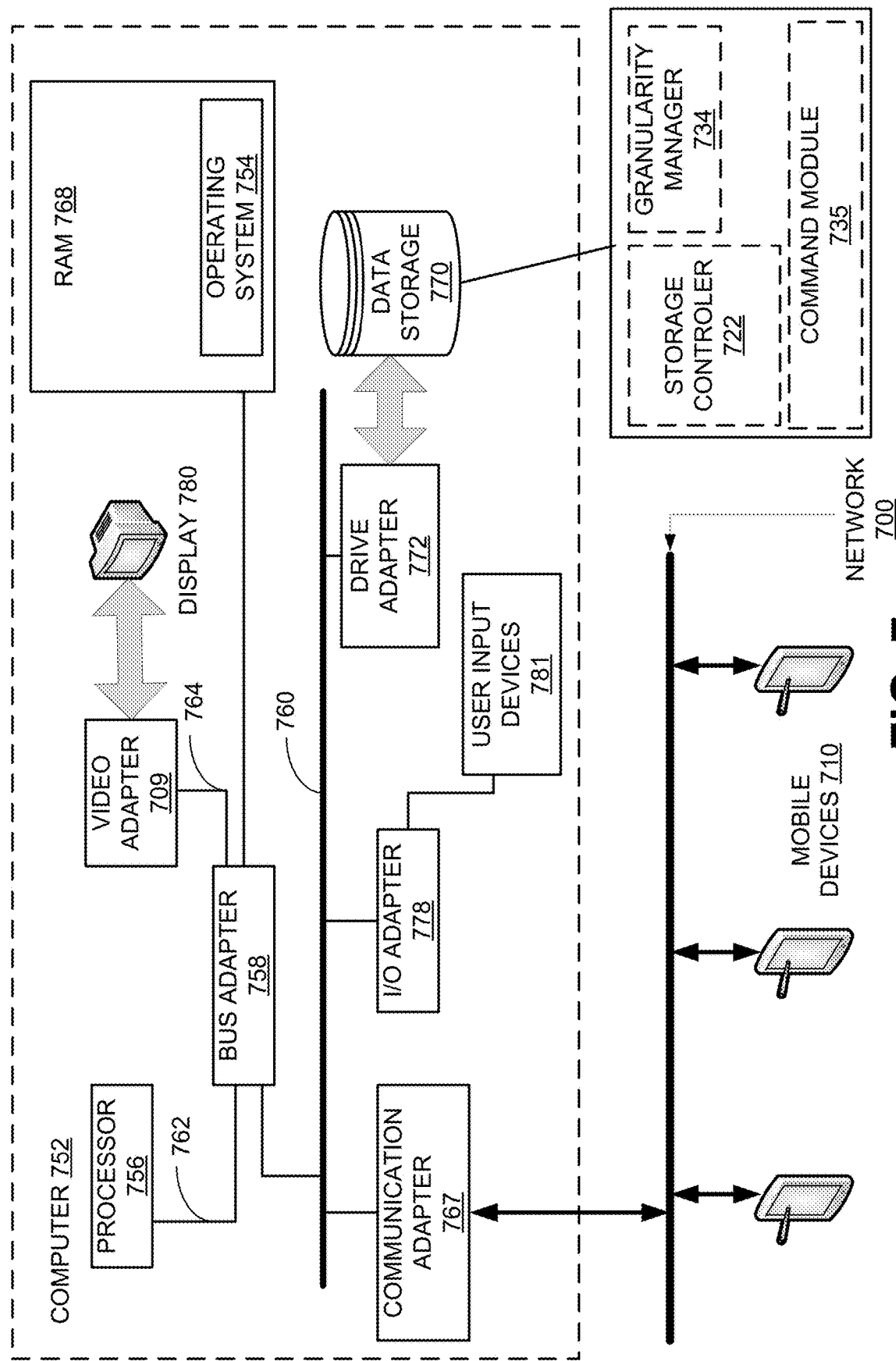
FIG. 7 illustrates a block diagram of automated computing machinery, according to various embodiments.

FIG. 7 illustrates a block diagram of automated computing machinery, according to various embodiments. The computing machinery may include example computer 752 useful in performing aspects of the disclosure, according to various embodiments. The computer 752 of FIG. 7 includes at least one computer processor 756 or 'CPU' as well as random access memory 768 ('RAM') which is connected through bus adapter 758 to processor 756 and to other components of the computer 752.

The RAM 768 may include an operating system 754. Operating systems useful for record filtering according to embodiments of the present invention include UNIX®, Linux®, Microsoft XP™, AIX®, IBM's i5/OS™, and others. The operating system 754 are shown in RAM (768), but many components of such software typically are stored in non-volatile memory also, such as, for example, on a disk drive 770.

The computer 752 may also include disk drive adapter 772 coupled through expansion bus 760 and bus adapter 758 to processor 756 and other components of the computer 752. Disk drive adapter 772 connects non-volatile data storage to the computer 752 in the form of disk drive 770. Disk drive adapters useful in computers include Integrated Drive Electronics ('IDE') adapters, Small Computer System Interface ('SCSI') adapters, and others. Non-volatile computer memory also may be implemented for as an optical disk drive, electrically erasable programmable read-only memory (so-called 'EEPROM' or 'Flash' memory), RAM drives, and so on.

The data storage 770 may include one or more storage devices in a tiered configuration. The data storage 700 may be configured to have a storage controller 722. The storage controller 722 for the data storage 770 may have a granularity manager 734. The storage controller 722 may perform the granularity level verification before a write described herein. The granularity manager 734 may manage the granularity levels associated with a write. In various embodiments, a command module 735 may act as a manager for a local storage device on a client computer. The command module 735 may communicate with the storage controller 722.

The example computer 752 includes one or more input/output (I/O') adapters 778. I/O adapters implement user-oriented input/output through, for example, software drivers and computer hardware for controlling output to display devices such as computer display screens, as well as user input from user input devices 781 such as keyboards and mice. The example computer 752 includes a video adapter 709, which is an example of an I/O adapter specially designed for graphic output to a display device 780 such as a display screen or computer monitor. Video adapter 709 is connected to processor 756 through a high speed video bus 764, bus adapter 758, and the front side bus 762, which is also a high speed bus.

The example computer 752 includes a communications adapter 767 for data communications with other computers 710, e.g., mobile devices, and for data communications with a data communications network 800. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters include modems for wired dial-up communications, Ethernet (IEEE 802.3) adapters for wired data communications network communications, and IEEE 802.77 adapters for wireless data communications network communications.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Referring to FIG. 7, the present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method for reading data stored in a storage tier of a client computer by the client computer in an extent-based storage system having two or more storage tiers, an extent being a contiguous area of storage, comprising:

providing, by a first client computer, write access permission to a particular volume of a storage device on the first client computer to a storage controller, wherein the storage device is communicatively coupled to the storage controller;

providing, by the first client computer, a first granularity level for the write access permission for the particular volume of the storage device of the first client computer, and providing a first duration for the write access permission, wherein the first granularity level specifies a subset of the particular volume, and the first duration includes a start time and a duration time;

receiving, by the first client computer, a write request notification from the storage controller of a first write request to a record on the particular volume;

receiving, by the first client computer, a write notification from the storage controller, the write notification indicating that a write corresponding with the write request notification has been committed to the storage device;

queuing a read request within the first granularity level to the storage device by the first client computer for a time period ending with the receiving of the write notification; and performing, by the first client computer, the queued read request in response to the receiving the write notification;

wherein the receiving the write request notification, the receiving the write notification, and the performing the queued read request all occur after the start time and before an end of the first duration.

2. The method of claim 1, further comprising:

receiving, by the first client computer and during the first duration, a second write request notification from the storage controller of a second write request to a second record on the particular volume;

receiving, by the first client computer and during the first duration, a second write notification from the storage controller, the second write notification indicating that a second write corresponding with the second write request notification has been committed to the storage device;

queuing a second read request within the first granularity level to the storage device by the first client computer for a second time period ending with the receiving of the second write notification; and performing, by the first client computer and during the first duration, the queued second read request in response to receiving the second write notification.

3. The method of claim 1, wherein a second write to a second record on the particular volume occurs during the first duration, and wherein, responsive to the second record being on the particular volume and outside of the specified subset of the particular volume, the first client computer is not notified of the second write before it occurs.

4. The method of claim 1, further comprising:

quiescing, by the first client computer and during the first duration, the first granularity level; and resuming, by the client computer and during the first duration, the first granularity level, wherein, during a period that the granularity level is quiesced, the storage controller does not provide notifications of write requests to the specified subset of the particular volume.

5. The method of claim 1, wherein additional write requests notifications are received during the first duration.

6. A client computer in an extent-based storage system having two or more storage tiers, an extent being a contiguous area of storage, the client computer having a processor configured to perform a method for reading data stored in a storage tier of the client computer, the method comprising:

providing, by a first client computer, write access permission to a particular volume of a storage device on the first client computer to a storage controller, wherein the storage device is communicatively coupled to the storage controller;

providing, by the first client computer, a first granularity level for the write access permission for the particular volume of the storage device of the first client computer, and providing a first duration for the write access permission, wherein the first granularity level specifies a subset of the particular volume, and the first duration includes a start time and a duration time;

receiving, by the first client computer, a write request notification from the storage controller of a first write request to a record on the particular volume;

receiving, by the first client computer, a write notification from the storage controller, the write notification indicating that a write corresponding with the write request notification has been committed to the storage device;

queuing a read request within the first granularity level to the storage device by the first client computer for a time period ending with the receiving of the write notification; and performing, by the first client computer, the queued read request in response to the receiving the write notification;

wherein the receiving the write request notification, the receiving the write notification, and the performing the queued read request all occur after the start time and before an end of the first duration.

7. The client computer of claim 6, wherein the method further comprises:

receiving, by the first client computer and during the first duration, a second write request notification from the storage controller of a second write request to a second record on the particular volume;

receiving, by the first client computer and during the first duration, a second write notification from the storage controller, the second write notification indicating that a second write corresponding with the second write request notification has been committed to the storage device;

queuing a second read request within the first granularity level to the storage device by the first client computer for a second time period ending with the receiving of the second write notification; and performing, by the first client computer and during the first duration, the queued second read request in response to receiving the second write notification.

8. The client computer of claim 7, wherein the second time period occurs after the time period, and wherein the record and the second record are the same.

9. The client computer of claim 6, wherein a second write to a second record on the particular volume occurs during the first duration, and wherein, responsive to the second record being on the particular volume and outside of the specified subset of the particular volume, the first client computer is not notified of the second write before it occurs.

10. The client computer of claim 6, wherein the method further comprises:

quiescing, by the first client computer and during the first duration, the first granularity level; and resuming, by the client computer and during the first duration, the first granularity level, wherein, during a period that the granularity level is quiesced, the storage controller does not provide notifications of write requests to the specified subset of the particular volume.

11. The client computer of claim 6, wherein additional write requests notifications are received during the first duration.

12. A computer program product comprising a non-transitory computer readable storage medium having program instructions embodied therewith, the program instructions configured to cause a processor of a client computer in an extent-based storage system having two or more storage tiers, an extent being a contiguous area of storage, to perform a method for reading data stored in a storage tier of the client computer, the method comprising:
   providing, by a first client computer, write access permission to a particular volume of a storage device on the first client computer to a storage controller, wherein the storage device is communicatively coupled to the storage controller;
   providing, by the first client computer, a first granularity level for the write access permission for the particular volume of the storage device of the first client computer, and providing a first duration for the write access permission, wherein the first granularity level specifies a subset of the particular volume, and the first duration includes a start time and a duration time;
   receiving, by the first client computer, a write request notification from the storage controller of a first write request to a record on the particular volume;
   receiving, by the first client computer, a write notification from the storage controller, the write notification indicating that a write corresponding with the write request notification has been committed to the storage device;
   queuing a read request within the first granularity level to the storage device by the first client computer for a time period ending with the receiving of the write notification; and
   performing, by the first client computer, the queued read request in response to the receiving the write notification;
   wherein the receiving the write request notification, the receiving the write notification, and the performing the queued read request all occur after the start time and before an end of the first duration.

13. The computer program product of claim 12, wherein the method further comprises:
   receiving, by the first client computer and during the first duration, a second write request notification from the storage controller of a second write request to a second record on the particular volume;
   receiving, by the first client computer and during the first duration, a second write notification from the storage controller, the second write notification indicating that a second write corresponding with the second write request notification has been committed to the storage device;
   queuing a second read request within the first granularity level to the storage device by the first client computer for a second time period ending with the receiving of the second write notification; and
   performing, by the first client computer and during the first duration, the queued second read request in response to receiving the second write notification.

14. The computer program product of claim 13, wherein the second time period occurs after the time period, and wherein the record and the second record are the same.

15. The computer program product of claim 12, wherein a second write to a second record on the particular volume occurs during the first duration, and wherein, responsive to the second record being on the particular volume and outside of the specified subset of the particular volume, the first client computer is not notified of the second write before it occurs.

16. The computer program product of claim 12, wherein the method further comprises:
   quiescing, by the first client computer and during the first duration, the first granularity level; and
   resuming, by the client computer and during the first duration, the first granularity level,
   wherein, during a period that the granularity level is quiesced, the storage controller does not provide notifications of write requests to the specified subset of the particular volume.

17. The computer program product of claim 12, wherein additional write requests notifications are received during the first duration.

* * * * *